United States Patent Office 3,325,289
Patented June 13, 1967

3,325,289
FLUID SUGAR RESIDUES CONTAINING WATER-SOLUBLE ALKALI METAL POLYPHOSPHATE AND PROCESSES
John W. Lyons, Webster Groves, Mo., assignor to Monsanto Company, a corporation of Delaware
No Drawing. Filed Apr. 16, 1963, Ser. No. 273,278
19 Claims. (Cl. 99—6)

The present invention relates to animal feed mixtures and more particularly to certain novel compositions which are useful as components in animal feeds. The present invention further relates to stable compositions comprising sugar-containing residues and certain phosphorous-containing compounds which are useful as components in animal feeds. The present invention still further relates to processes for stabilizing compositions comprising sugar-containing residues and certain phosphorous-containing compounds against gellation so that such compositions can be readily incorporated in animal feed mixtures.

Animal feeds, including poultry, cattle and swine rations or ration supplements have conventionally contained, inter alia, ground grains such as corn, wheat, milo, barley and oats, fibrous materials such as alfalfa and timothy hay; cotton seed oil meal and soybean oil meal and certain inorganic minerals, usually in the form of inorganic salts, for example, dicalcium phosphate, sodium chloride and iron and manganese sulfates and other trace elements required in animal nutrition. Additionally, such feeds are supplemented with sugar-containing residues obtained as by-products in the commercial manufacture of sugar such as cane molasses, beet molasses and the like. These latter materials are convenient additives to animal rations in that they provide a source of readily available carbohydrate energy for the animals, contain trace minerals and other food values originally present in the plants from which the sugar was derived, are economical and tend to make the feed or ration more appetizing to the animal.

However, the above-described animal feeds possess certain disadvantages, particularly since the sources of phosphorous values in the feeds are not always assimilated by the animals as rapidly as might be desired and/or required for adequate growth and health of the animal. Such slow assimilation may possibly be due to the relatively low solubility of the source of the phosphorous values, which is usually calcium salts of phosphoric acids, in the digestive juices of the animal. In any event, there has been a long-recognized need to economically provide phosphorous values in animal feeds, particularly in feeds fed to growing animals, in adequate quantities and in a form which can be readily assimilated by the animals. To fulfill this need, it has been proposed to add orthophosphoric acid or ammonium salts of orthophosphoric acid to animal feeds to economically provide sufficient and readily assimilable sources of phosphorous values in animal feeds. However, orthophosphoric acid, when added directly to animal feeds, tends to decompose or hydrolyze certain ingredients or components in the feed mixture, and the feeds become unstable and acquire undesirable and un-appetizing textural qualities. Also, ammonium orthophosphates sometimes tend to decompose when incorporated in animal feeds and impart an ammoniacal odor which tends to render the feeds unpalatable.

It has also been proposed and attempts have been made to overcome the above-mentioned difficulty by incorporating or diluting orthophosphoric acid or ammonium orthophosphates with molasses and to add this mixture to a dry pre-mix containing the remainder of the feed constituents to obtain an economic, uniformly mixed ration which is stable, has a desirable texture, is appetizing and would contain adequate phosphorous values which could be readily assimilated by the animals. However, this procedure has generally proved unfeasible because the commercially available sugar-containing residues, which often thicken on standing, tend to form an irreversible gel almost immediately or within a relatively short time when orthophosphoric acid or ammonium salts thereof are added to the sugar-containing residues. In the gelled state, it is virtually impossible to uniformly mix or incorporate the gel in the dry pre-mix containing the remaining dietary constituents.

In accordance with the present invention, however, it has been found possible to provide compositions comprising the aforementioned sugar-containing residues, orthophosphoric acid or ammonium salts thereof and also other assimilable phosphorous compounds which are physically stable, that is, are stable against gellation for prolonged periods of time and to provide processes which stabilize such compositions against gellation. The compositions so-obtained can then be readily mixed with the remainder of the animal feed constituents to provide superior stable and economical animal rations containing adequate quantities of assimilable phosphorous values.

It is one object of the present invention to provide novel fluid compositions comprising sugar-containing residues and certain phosphorous-containing compounds which are useful as components in animal feeds and which are physically stable, that is, are stable against gellation for prolonged periods of time, e.g., up to six months or longer.

It is another object of the present invention to provide novel processes for stabilizing gel-forming compositions against gellation which compositions comprise (1) sugar-containing residues obtained as by-products in the commercial manufacture of sugar, and (2) certain ortho- and/or pyrophosphates.

Additional objects and advantages of the present invention are disclosed in or will become apparent from the following description and the appended claims.

In accordance with one aspect of the present invention, it has been found possible to stabilize gel-forming compositions comprising (1) a major proportion of one or more sugar-containing residues obtained as by-products in the commercial manufacture of sugars, and (2) a minor proportion of compounds such as ortho- and pyrophosphoric acids, alkali metal and ammonium salts of these acids and mixtures of one or more of these compounds by adding to and mixing with said compositions an amount sufficient to stabilize the composition against gellation of a water-soluble alkali metal polyphosphate where the molecules have an average number of phosphorous atoms greater than 2. The phrase "ortho- and/or pyrophosphates" as used herein is intended to mean and include orthophosphoric acid, pyrophosphoric acid, alkali metal and ammonium salts of these acids and mixtures thereof.

In accordance with another aspect of this invention, there is provided novel fluid compositions which are stable against gellation and are useful as a component for providing available phosphorus values in animal feeds, which compositions comprise a mixture of (1) a major proportion of a sugar-containing residue or a mixture of sugar-containing residues obtained as a by-product in the commercial manufacture of a sugar, (2) a minor amount of one or more ortho- and/or pyrophosphates, and (3) an amount sufficient to maintain the composition in a fluid state of a water-soluble alkali metal polyphosphate having an average chain-length greater than 2. Such compositions can be readily admixed with conventional feed grain-mineral mixtures to provide economical animal rations containing adequate and assimilable phosphorus values.

The sugar-containing residues employed in the processes and compositions of this invention are conventional components in animal feeds and are, as noted above, by-products obtained from the commercial manufacture of sugars. The residues are usually dark-colored syrupy substances obtained after the extraction of all commercially profitable crystallizable sugars. Generally, these residues are composed of inorganic salts and organic non-sugar materials in a saturated aqueous solution of a sugar. The residues vary widely, depending upon their origin, with respect to amount and content of inorganic salts and non-sugar materials. Although substantially all of the residues form irreversible gels when certain materials are admixed with them, some residues themselves thicken almost to the point of gellation, and these residues gel almost immediately when ortho- and/or pyrophosphates are added thereto. Representative of these residues are cane and beet molasses, although sugar-containing residues obtained from sugars manufactured from citrus fruits, corn, wood, and sorghum, which are also sometimes called molasses may be employed in the processes and compositions of this invention. These and other sugar-containing residues are described in detail in volume 10, pages 167 to 180 of the "Encyclopedia of Chemical Technology" edited by Raymond E. Kirk and Donald F. Othmer and published in 1952 by the Interscience Encyclopedia Inc., New York, N.Y., and these may be employed in the compositions and processes of this invention.

The amount of one or more sugar-containing residues which may be suitably employed in the compositions or processes of this invention is preferably a major amount, for example, between about 50% up to about 98% by weight of the composition of this invention. Generally speaking, and as will be hereinafter evident, the quantity of such sugar-containing residue will depend on the amount and kind of ortho- and/or pyrophosphate which it is desired to employ, and to a somewhat lesser extent on the tendency of the sugar-containing residue to thicken or to form a gel. Preferred compositions will usually contain from about 70% to about 97% by weight of a sugar-containing residue such as a cane molasses or a beet molasses.

As noted hereinbefore, compounds such as orthophosphoric acid ($H_3PO_4$), pyrophosphoric acid ($H_4P_2O_7$) and alkali metal and ammonium salts of these acids and/or mixtures of any of these compounds are employed in the compositions and processes of this invention. Generally speaking, although pyrophosphoric acid per se may be employed it is preferable to employ this acid in the form of a mixture with orthophosphoric acid or salts of ortho- and/or pyrophosphoric acids. Examples of salts of ortho-phosphoric acids which may be suitably employed include mono-, di- and tri-ammonium orthophosphate and the corresponding sodium and potassium salts of these orthophosphates. Examples of salts of pyrophosphoric acid include tetra-ammonium pyrophosphate, di-ammonium, di-hydrogen pyrophosphate and the corresponding sodium and potassium salts of these pyrophosphates. Generally speaking, from an economic standpoint, it is preferred to employ orthophosphoric acid and ammonium orthophosphates in the compositions and processes of this invention, and it is particularly preferred to employ orthophosphoric acid.

The amount of one or more of the above-mentioned phosphorous-containing compounds which may be employed in the processes and compositions may vary from about 1.0% to about 15.0% by weight depending, among other things, on the amount of phosphorous desired, and the particular compound employed. Thus, for example, when it is desired to use orthophosphoric acid, pyrophosphoric acid or mixtures of these acids from about 1.0% to about 10% by weight, as 100% $H_3PO_4$ acid, based on the weight of the molasses composition is usually employed. If less than 1.0% by weight of one or a mixture of both of these phosphoric acids are used, the composition will contain too little phosphorous to be of practical value. On the other hand, there is usually little need for a composition which would contain more phosphorous than that provided when the composition contains about 10% by weight of a phosphoric acid preferably a mixture of ortho- and pyrophosphoric acid. Usually compositions containing from about 3% to 7% by weight of orthophosphoric acid, pyrophosphoric acid or mixtures thereof provide adequate phosphorous to be highly useful as animal feed components. When alkali metal or ammonium salts of the above-mentioned phosphoric acids are employed, the amount used will usually vary from about 1% to about 15%, preferably from about 5% to about 12% by weight of such salts and will provide compositions containing adequate phosphorous to be useful as components in animal feed components.

As noted hereinbefore, the sugar-containing residues employed in the compositions of this invention have a tendency to thicken upon standing and to form an irreversible gel almost immediately upon the addition of significant amounts of orthophosphoric acid, pyrophosphoric acid or alkali metal or ammonium salts thereof to the sugar-containing residue.

It has presently been found possible to prevent such gellation by incorporating minor amounts of a water-soluble alkali metal or an ammonium polyphosphate, preferably an alkali metal or ammonium polyphosphate containing an average of more than 2 and at least 3 phosphorous atoms per molecule, into compositions comprising the sugar-containing residues and one or more of the ortho- and/or pyrophosphates hereinbefore described. Generally speaking, it has been found desirable to mix the polyphosphate in the sugar-containing residue prior to the addition of the ortho- and/or pyrophosphate to the residue. Alternatively, however, the polyphosphate may be added thereto after the ortho- and/or pyrophosphate has been added, but prior to the gellation of the mixture. If the polyphosphate is added to the mixture after gellation has occurred, it is usually difficult, if not impossible, to obtain an adequate dispersion of the polyphosphate in the gel which is sufficient to break the gel, and to provide a fluid composition which is stable against gellation.

The water-soluble alkali metal or ammonium polyphosphates which are suitable for use in the compositions and processes of this invention are condensed or molecularly dehydrated, crystalline or amorphous polymeric phosphates having $M_2O/P_2O_5$ molar ratios where M is an alkali metal or $NH_4$ between 1 and about 1.6 are usually linear and may have chain lengths varying from 3 to about 600 or more. The term "chain length" as applied to linear or straight chain polymeric phosphates refers to the average number of phosphorous atoms in the straight chain polymer. Such polyphosphates have been described in the literature, specifically in an article by J. R. Van Wazer in the Journal of the American Chemical Society, volume 72, pages 644–655 in 1950. The polyphosphates, such as alkali metal tripolyphosphates which have shorter chain lengths may be crystalline or amorphous in form depending upon their method of preparation, but polyphosphates having a chain length greater than 4 are almost always amorphous or glass-like. As is pointed out by Van Wazer, polyphosphates having longer chain lengths, e.g. of about 5 or more, are usually mixtures of molecules having varying chain lengths. The average chain length of such mixtures of linear polyphosphates or phosphate glasses is primarily a function of the ratio of $M_2O/P_2O_5$, where M is an alkali metal, in the melt from which the polyphosphate is formed. The predominant polymer in such a mixture has a chain length equal to the whole number most closely approaching the value of the average chain length. The proportions of other chain-length polymers in the mixture become progressively smaller as the chain length increases or decreases from the average chain length. The average chain length of the polyphosphates becomes increasingly greater as the ratio of $M_2O/P_2O_5$ decreases ranging from about 1.6 in the case of sodium tripolyphosphate to about 1.4 in the case of sodium hexametaphosphate and gradually approaches unity as the chain length increases in certain Graham's salts and in Kurrol's salts (a water-soluble potassium polyphosphate). The term "water soluble alkali metal polyphosphates" as used herein is intended to mean and to include water-soluble ammonium polyphosphates as well as alkali metal polyphosphates due to the similarity in properties of $NH_4$ and alkali metal polyphosphates. Thus, alkali metal moiety of the above polyphosphates may include sodium, potassium, ammonium, lithium or rubidium.

Although any of the above-described water-soluble alkali metal polyphosphates may be employed in the compositions and processes of this invention, sodium and potassium linear polyphosphates having a chain length of from about 3 to several hundred are preferred and particularly preferred compounds are sodium tripolyphosphate, sodium hexametaphosphate, Graham's salts and Kurrol's salts. In addition to their unexpected properties in preventing the gellation of mixtures of sugar-containing residues and ortho- and/or pyrophosphates, the water-soluble alkali metal polyphosphates are further advantageous when included in the compositions of this invention in that they constitute a small but significant further sourse of phosphorous which is readily available to the animal when such compositions are incorporated in animal feed rations.

The amount of the water-soluble alkali metal polyphosphates which may be employed in the compositions and processes of this invention is a minor amount, that is, an amount sufficient to maintain the compositions in a fluid state, and will generally depend upon the amount of ortho- and/or pyrophosphate in the compositions and also the degree of tendency of the sugar-containing residues to form a gel when mixed with the ortho- and/or pyrophosphate. Often, depending upon the nature of the sugar-containing residue, amounts as little as 200 parts per million of polyphosphates are suitable and will prevent gellation in compositions comprising sugar-containing residues and ortho- and/or pyrophosphates to which they are added. Generally, from the about 0.1% to about 2.0%, preferably 0.1% to about 1.0% by weight of water-soluble alkali metal polyphosphate, where the larger amount of polyphosphate corresponds to greater quantities of ortho- and/or pyrophosphate employed, will prevent gellation in mixtures of sugar-containing residues and ortho- and/or pyrophosphates. Although more than 5.0% by weight of polyphosphates may be employed, there is usually no advantage obtained and the compositions may become uneconomical from a cost standpoint. When desirable, the ortho- and/or pyrophosphates and polyphosphates may be mixed with small amounts, up to about 25% by weight of water to facilitate the mixing of these materials with the other ingredients.

In one preferred embodiment of this invention, the compositions provided are fluid and comprise a mixture of (1) major proportion of a sugar-containing residue, preferably a cane or a beet molasses, (2) from about 1% to about 15%, preferably from about 5% to about 12%, by weight of an ammonium orthophosphate which may be any one or mixtures of tri-ammonium orthophosphate, di-ammonium orthophosphate or mono-ammonium orthophosphate, and (3) from about 0.1% to about 1.0% of any of the hereinbefore described water-soluble alkali metal polyphosphates having a chain length greater than 2. In particularly preferred compositions, the polyphosphate may be Graham's salt, sodium tripolyphosphate and/or sodium hexametaphosphate.

In another preferred embodiment of this invention, the compositions provided are fluid and comprise a mixture of (1) a major proportion of a cane or a beet molasses, (2) from about 1% to about 10%, preferably from about 2.0% to 7.0%, by weight of orthophosphoric acid or a mixture of ortho- and pyrophosphoric acids, and (3) from about 0.1% to about 1.0% of one or a mixture of one or more of the water-soluble alkali metal tripolyphosphates.

In a particularly preferred embodiment of this invention, the compositions provided are fluid and comprise a mixture of (1) a major proportion of a cane or a beet molasses, (2) from about 2% to about 7% by weight of orthophosphoric acid, and (3) from about 0.1% to about 1.0% by weight of sodium tripolyphosphate, sodium hexametaphosphate and/or Graham's salt.

As noted hereinbefore, compositions which consist of mixtures of sugar-containing residues and ortho- and/or pyrophosphates, gel almost immediately or within a relatively short period of time and such compositions are stabilized against gellation in accordance with this invention by the addition of water-soluble alkali metal polyphosphates in the amounts hereinbefore described. In order to provide the compositions of this invention in a stable fluid state, it is desirable to mix the alkali metal polyphosphates with the other ingredients before gellation occurs. Thus, it has been found preferable to add the alkali metal phosphates to the sugar-containing residues prior to or simultaneously with the ortho- and/or pyrophosphates. By so-proceeding, it is possible to achieve compositions which are stable fluids and which will not gel on standing for periods of six months or longer. Although sometimes it may be possible to add the alkali-metal polyphosphates to the mixtures after gellation has occurred, such procedure is often encumbered with difficulty. Although the addition of an alkali-metal polyphosphate will usually break the gel after it has formed, it is usually time consuming and laborious to disperse the polyphosphate to the extent that a fluid composition, stable against gellation upon standing will be obtained.

The following specific examples illustrate the invention, but are not intended to limit the scope thereof, parts and percentages being by weight unless otherwise indicated.

*Example 1*

The following compositions having the proportions shown below were prepared by adding and mixing the indicated water-soluble alkali metal polyphosphates to certain cane and beet molasses to form a mixture of these constituents and thereafter adding and mixing the ortho- and/or pyrophosphates with the mixture.

| Ingredient | Composition Number | | | | | | | | |
|---|---|---|---|---|---|---|---|---|---|
|  | 1 | 2 | 3 | 4 | 5 | 6 | 7 | 8 | 9 |
| Cane Molasses | 91.5 |  | 87.4 |  | 90.3 |  | 89.6 |  | 46.7 |
| Beet Molasses |  | 93.4 |  | 88.5 |  | 87.3 |  | 89.7 | 46.7 |
| Orthophosphoric Acid | 6 | 4 |  |  |  |  |  |  | 4 |
| Pyrophosphoric Acid |  | 1 |  |  |  |  |  |  | 1 |
| Di-ammonium Orthophosphate |  |  | 6 | 11 |  |  |  |  |  |
| Mono-ammonium Orthophosphate |  |  | 6 |  | 9 |  |  |  |  |
| Trisodium Orthophosphate |  |  |  |  |  | 12 |  |  |  |
| Di-ammonium Pyrophosphate |  |  |  |  |  |  | 10 |  |  |
| Tetra-sodium Pyrophosphate |  |  |  |  |  |  |  | 10 |  |
| Sodium Tripolyphosphate | 0.5 |  | 0.6 |  |  |  |  | 0.7 | 0.3 |
| Sodium Hexametaphosphate |  | 0.6 |  | 0.5 |  |  | 0.4 |  | 0.3 |
| Graham's Salt |  |  |  |  | 0.7 |  |  |  |  |
| Kurrol's Salt |  |  |  |  |  | 0.7 |  |  |  |
| Water | 2 | 1 |  |  |  |  |  |  | 1 |

The above compositions were fluid and pourable after 23 weeks of storage in a laboratory cabinet at 100° F. On the other hand, compositions similar to compositions 1 through 9, but which differed in that they did not contain alkali metal polyphosphates formed thick non-pourable gels within 12 hours.

*Example II*

Nine separate fluid compositions having the formulary constituents of compositions 1 through 9 of Example I were prepared by simultaneously adding and mixing, with agitation, the ortho- and/or pyrophosphates and the water-soluble alkali metal polyphosphates to the cane and/or beet molasses. Compositions so prepared were fluid after 4 months of storage at 100° F.

*Example III*

Nine separate fluid compositions having the formulary constituents of compositions 1 through 9 of Example I were prepared by first adding and mixing, with agitation, the ortho- and/or pyrophosphates and molasses and shortly thereafter, while agitation was continued and before the mixtures gelled, adding the water-soluble alkali metal polyphosphates to the mixture, compositions so prepared were fluid after 4 months of storage at 100° F.

*Example IV*

The following experiment demonstrates the usefulness of the compositions of this invention as components in animal feeds.

Fifteen parts (pounds) by weight of the fluid compositions of Examples I through III were added and admixed with an animal feed pre-mix containing the ingredients listed below. Twenty seven batches, each weighing 100 lbs. and containing one of the 27 compositions of Examples I through III were prepared:

| Ingredient: | Pounds |
|---|---|
| Soybean oil meal | 5.0 |
| Cottonseed oil meal | 4.0 |
| Dehydrated alfalfa meal | 5.0 |
| Ground corn | 27.75 |
| Ground milo | 11.75 |
| Barley | 20.00 |
| Beet pulp | 10.00 |
| Mineral supplement | 1.00 |
| Salt | .50 |
| Molasses-phosphate composition [1] | 15.00 |
| | 100.00 |

[1] Each one of the 27 compositions of Examples I through III was used in one of the twenty-seven batches.

The above rations were fed to 3 groups of six-month old calves for 30 days. A fourth group of calves received a commercial ration, in which the phosphorous values were provided by di-calcium phosphate. The three groups of calves fed the rations containing the compositions of this invention all gained significantly more weight than the group of calves which were fed the commercial ration. Additionally, the three groups of calves exhibited a significantly better food efficiency ratio, i.e., weight gain per pound of food consumed, than the group of calves fed the commercially available ratio.

What is claimed is:

1. A fluid composition useful as a component in animal feeds, comprising a mixture of (1) a major proportion of a sugar-containing residue obtained as a by-product in the commercial manufacture of a sugar, (2) a minor amount, sufficient to normally cause gellation, of a compound selected from the group consisting of orthophosphoric acid, pyrophosphoric acid, alkali metal and ammonium salts of these acids and mixtures thereof, and (3) an amount, sufficient to maintain said composition in a fluid state, of a water-soluble alkali metal polyphosphate having a chain length greater than 2.

2. A composition as in claim 1, wherein the sugar-containing residue is a beet molasses.

3. A composition as in claim 1, wherein the sugar-containing residue is a cane molasses.

4. A fluid composition, useful as a component in animal feeds, comprising a mixture of (1) a major proportion of a sugar-containing residue obtained as a by-product in the commercial manufacture of a sugar, (2) an amount, sufficient to normally cause gellation, of ammonium orthophosphate, said amount being from about 1% to about 15% by weight of said fluid composition, and (3) from about 0.1% to about 1.0% weight of a water-soluble alkali metal polyphosphate having a chain length greater than 2.

5. A fluid composition, useful as a component in animal feeds, comprising a mixture of (1) a major proportion of a sugar-containing residue obtained as a by-product in the commercial manufacture of a sugar, (2) an amount sufficent to normally cause gellation, of a mixture of ortho- and pyrophosphoric acids, said amount being from about 1% to about 10% by weight of said fluid composition, and (3) from about 0.1% to about 1.0% by weight of a water-soluble alkali metal polyphosphate having a chain length greater than 2.

6. A fluid composition, useful as a component in animal feeds, comprising a mixture of (1) a major proportion of a sugar-containing residue obtained as a by-product from the commercial manufacture of a sugar, (2) an amount, sufficient to normally cause gellation, of orthophosphoric acid, said amount being from about 1% to about 10% by weight of said fluid composition, and (3) from about 0.1% to about 1.0% of a water-soluble alkali metal polyphosphate having a chain length greater than 2.

7. A composition as in claim 6, wherein the alkali metal polyphosphate is Graham's salt.

8. A composition as in claim 6, wherein the alkali metal polyphosphate is sodium tripolyphosphate.

9. A composition as in claim 6, wherein the alkali metal polyphosphate is sodium hexametaphosphate.

10. A fluid composition, useful as a component in animal feeds, comprising a mixture of (1) a major proportion of a sugar-containing residue selected from the group consisting of cane and beet molasses, (2) an amount, sufficient to normally cause gellation, of orthophosphoric acid, said amount being from about 2% to about 7% by weight of said fluid composition, and (3) from about 0.1% to about 1.0% by weight of sodium tripolyphosphate.

11. A fluid composition, useful as a component in animal feeds, comprising a mixture of (1) a major proportion of a sugar-containing residue selected from the group consisting of cane and beet molasses, (2) an amount, sufficient to normally cause gellation, of orthophosphoric acid, said amount being from about 2% to about 7% by weight of said fluid composition, and (3) from about 0.1% to about 1.0% by weight of sodium hexametaphosphate.

12. An animal feed composition comprising (A) a major amount of a mixture of grains, oil meals, and minerals conventionally used in animal rations and having intimately admixed therewith, (B) a minor amount of a fluid composition comprising (1) a major proportion of a sugar-containing residue obtained as a by-product in the commercial manufacture of a sugar, (2) a minor amount, sufficient to normally cause gellation, of a compound selected from the group consisting of orthophosphoric acid, pyrophosphoric acid, alkali metal and ammonium salts of these acids and mixtures thereof, and (3) from about 0.1% to about 1.0% by weight based on the weight of the fluid composition of an alkali metal polyphosphate having a chain length greater than 2.

13. An animal feed composition comprising (A) a mixture of grains, oil meals and minerals conventionally used in animal rations and having intimately admixed therewith, (B) from about 1% to about 20% by weight, based on the weight of the feed composition, of a fluid composition comprising (1) a major proportion of a molasses selected from the group consisting of cane and beet molasses, (2) an amount, sufficient to normally cause gellation, of a compound selected from the group consisting of orthophosphoric acid, pyrophosphoric acid, alkali metal and ammonium salts of these acids and mixtures thereof, said amount being from about 1.0% to about 15% by weight based on the weight of the fluid composition, and (3) from about 0.1% to about 1.0% by weight based on the weight of the fluid composition of an alkali metal polyphosphate having a chain length greater than 2.

14. An animal feed composition comprising (A) a mixture of grains, oil meals, and minerals conventionally used in animal rations and having intimately mixed therewith, (B) from about 1.0% to about 20% by weight based on the weight of the feed composition of a fluid composition comprising (1) a major proportion of a sugar-containing residue selected from the group consisting of cane and beet molasses, (2) an amount, sufficient to normally cause gellation, of orthophosphoric acid, said amount being from about 1.0% to about 10% by weight of said fluid composition, and (3) from about 0.1% to about 1.0% by weight of sodium hexametaphosphate.

15. A process for stabilizing a composition comprising a major proportion of a sugar-containing residue obtained as a by-product in the commercial manufacture of a sugar and a minor proportion, sufficient to normally cause gellation, of a compound selected from the group consisting of orthophosphoric acid, pyrophosphoric acid, alkali metal ammonium salts of these acids and mixtures thereof, which comprises adding, prior to gellation of said composition an amount, sufficient to stabilize the composition against gellation, of a water-soluble alkali-metal polyphosphate having a chain length greater than 2.

16. A process for preparing a stable fluid composition which comprises the steps of (1) adding and mixing from about 0.1% to 1.0% by weight, based on the weight of the composition, of a water-soluble alkali-metal polyphosphate having a chain length greater than 2 to a sugar-containing residue obtained as a by-product in the commercial manufacture of a sugar, thereby forming a mixture, and (2) thereafter adding an amount, sufficient to normally cause gellation, of a compound selected from the group consisting of orthophosphoric acid, pyrophosphoric acid, alkali-metal and ammonium salts of these acids, and mixtures thereof, said amount being from about 1% to about 15% by weight, based on the weight of said composition.

17. A process as in claim 16, wherein the sugar-containing residue is a molasses selected from the group consisting of cane and beet molasses.

18. A process as in claim 17, wherein the water-soluble alkali metal polyphosphate is sodium tripolyphosphate.

19. A process as in claim 17, wherein the alkali-metal polyphosphate is sodium hexametaphosphate.

References Cited

UNITED STATES PATENTS

| | | | |
|---|---|---|---|
| 2,667,416 | 1/1954 | McFee | 99—7 |
| 2,748,001 | 5/1956 | Anderson et al. | 99—6 |
| 2,760,866 | 8/1956 | Nielsen | 99—2 |
| 2,965,489 | 12/1960 | Clickner | 99—6 |
| 3,011,891 | 12/1961 | Locuratolo | 99—2 |
| 3,124,459 | 3/1964 | Erwin | 99—2 |
| 3,165,413 | 1/1965 | Weber et al. | 99—6 |

FOREIGN PATENTS 229,665  11/1958  Australia.

A. LOUIS MONACELL, *Primary Examiner.*

D. J. DONOVAN, *Assistant Examiner.*